Dec. 15, 1959  G. BERGSON  2,917,066
FLUID FLOW CONTROL SYSTEM
Filed July 13, 1956  2 Sheets-Sheet 1

INVENTOR.
Gustav Bergson
BY
Eugene M. Whitacre
AGENT.

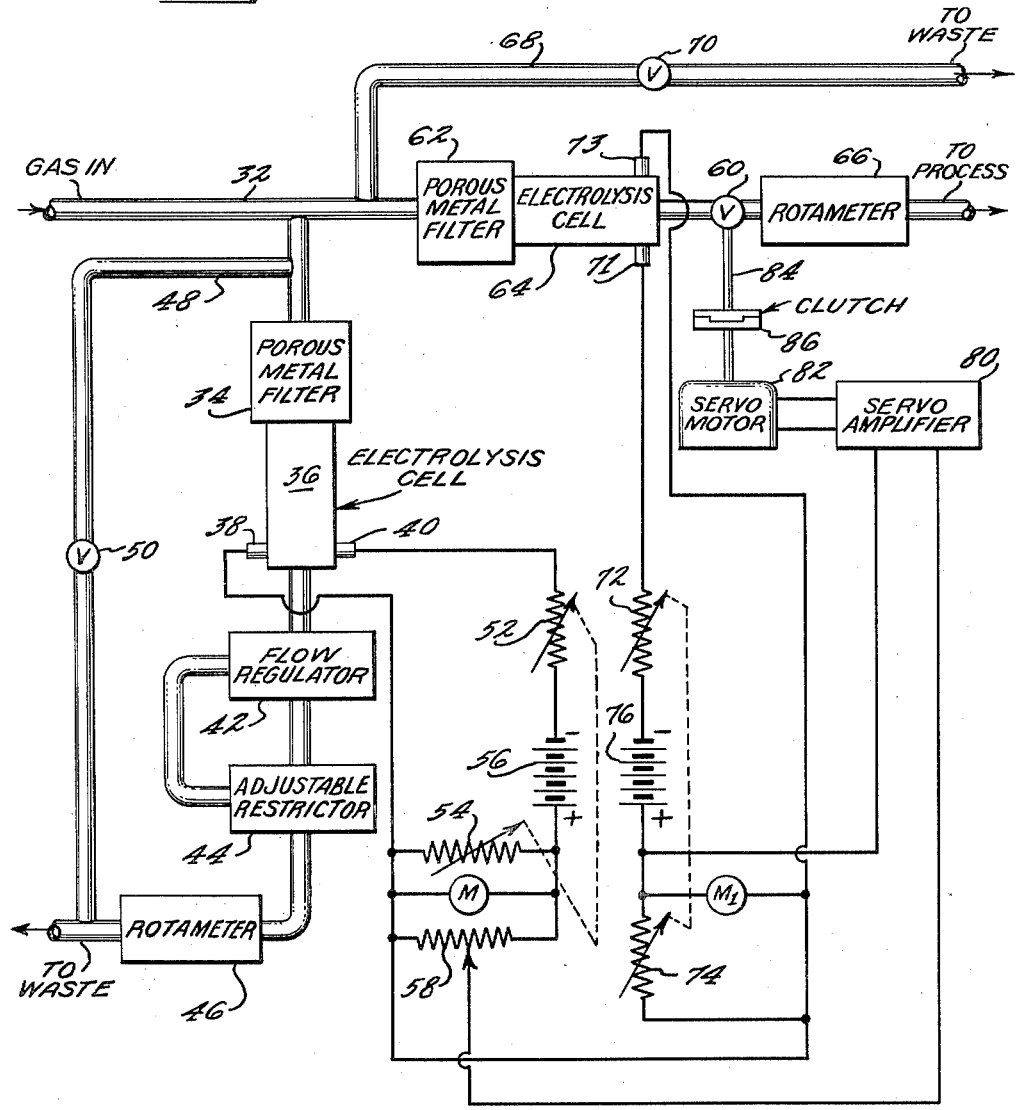

United States Patent Office 2,917,066
Patented Dec. 15, 1959

2,917,066

FLUID FLOW CONTROL SYSTEM

Gustav Bergson, Philadelphia, Pa.

Application July 13, 1956, Serial No. 597,670

5 Claims. (Cl. 137—101.19)

This invention relates to systems for controlling the rate of flow of fluids, and more particularly relates to automatic control systems for accurately and effectively regulating the flow rates of fluids such as gases.

For certain purposes, such as in chemical processes and the like, it is often desirable to provide control means for automatically regulating the flow rate of a fluid being used. Systems for automatically controlling the fluid flow at relatively high rates have heretofore been provided; however, when the rate of flow of the fluid to be controlled was very low, such as on the order of 10 cubic centimeters per minute (10 cc./min.) for gases, the flow rate had to be controlled by the manual adjustment of a flow rate controlling means such as a valve. This may require a more or less continuous monitoring of the system by an operator for the purpose of readjusting the flow to the desired rate, because of flow rate changes with variables such as temperature and pressure, etc.

It is accordingly an object of this invention to provide an improved fluid flow control system for automatically regulating the flow of a fluid such as a gas.

It is another object of this invention to provide an improved control system for automatically and effectively regulating the flow of a fluid such as a gas stream at rates of flow down to 10 cc./min. for gases, or less.

In accordance with the invention, a signal for controlling the rate of flow of a fluid is derived by comparing a signal representative of the amount of one of the components of the mixture comprising the fluid at the desired flow rate with a signal representative of the amount of the same component at a standard or reference rate. To this end, a first detector is provided for measuring the relative amount of a particular component in a desired fluid stream, when the flow of the fluid stream through the detector is maintained at a constant known rate. The detector is of a type which produces an electrical voltage or current, the magnitude of which is substantially directly proportional to the amount of the particular component present in the fluid stream and is also a function of the fluid flow rate. A second detector of similar construction is provided in series with the fluid stream to be controlled, and a second voltage of current is produced which is also directly proportional to the amount of the same component in the fluid stream detected by the first detector. The electrical signal derived from the detector having the constant known rate of flow is then compared with the signal from the detector in the controlled line and the result of the comparison is used to drive a servo-system which controls the fluid flow rate in the controlled line.

In an embodiment of the invention, the water content of a gas stream is detected by a detector which is sensitive to determine the parts per million (p.p.m.) of water in the gas stream. The first detector provides a reference signal corresponding to the water content of the gas at a reference rate of flow, such as, for example, 100 cc./min. The second detector in the controlled line provides a signal corresponding to the water content of the same gas at the desired flow rate such as, by way of example, 10 cc./min., and the value of the second signal will be related to the first signal in a predetermined manner. The signals are then compared in suitable electrical circuits and fed to a control system comprising a servo-amplifier and a servo-motor which is operable to adjust a valve for regulating the flow of a gas in the controlled line. Since the gas flowing through both detectors is the same, or from the same source, the operation of the system is not affected by changes in the water content of the gas.

It is accordingly another object of this invention to provide a fluid flow control system in which a signal for controlling the rate of flow of a fluid is derived by comparing a signal representative of the amount of one of the components of the fluid at the desired flow rate with a signal representative of the amount of the same component at a reference or standard rate of flow.

A still further object of this invention is to provide a system which is operable to control the rate of flow of a gas by deriving a signal representative of the water content of the gas at a known reference rate of flow, and comparing that signal with a signal representative of the water content of the gas at the desired rate of flow, and using the resultant of said comparison to control regulating means for maintaining said desired rate of flow constant, notwithstanding any changes in the water content of the gas.

In another aspect of the invention, if the component of the gas mixture being detected is maintained substantially constant or varies only slightly, a suitable detector in the controlled line will produce a signal which is representative of the flow rate, and this signal may be directly used to drive a servo-system which regulates the flow rate constant.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 2 is a more detailed schematic flow and electric circuit diagram of an automatic gas flow regulating system embodying the invention.

Figure 1:
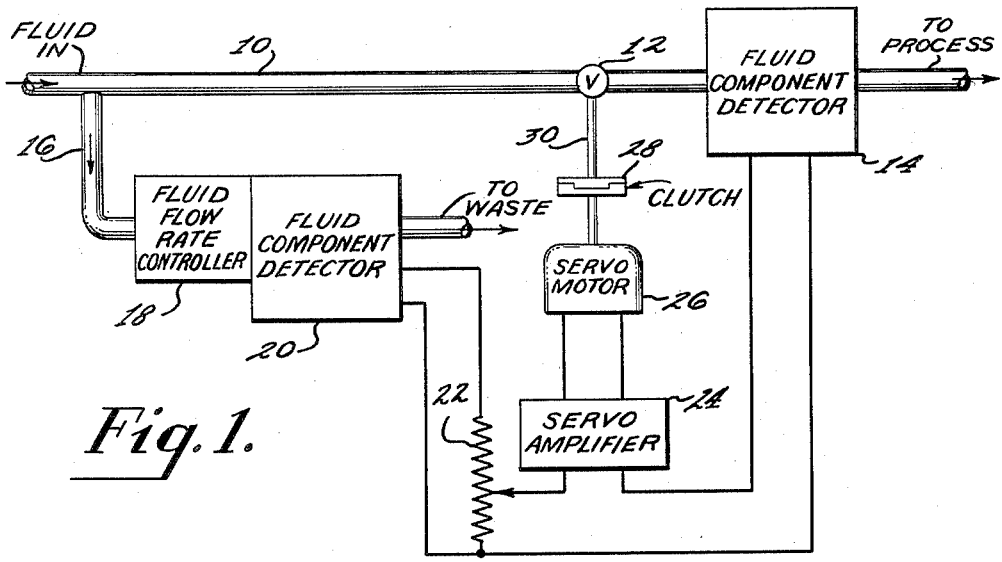
Figure 1 is a simplified schematic flow and electric circuit diagram of an automatic fluid flow control system embodying the invention.

Referring now to the drawing and particularly to Figure 1, a fluid to be controlled, such as a gas, is conveyed through a suitable pipe line 10, a valve 12 and a fluid component detector 14 to a chemical process or other desired utilization means. The rate of flow of the fluid to the chemical process is controlled by the setting of the valve 12 which is automatically adjusted to maintain the flow rate at the desired level, as will hereinafter be described.

A portion of the fluid from the pipe 10 is tapped off through a pipe line 16 and is passed through a fluid flow rate controller 18 to a second fluid component detector 20 which is similar in construction to the detector 14. The fluid flow rate controller 18 is of any conventional type and is adapted to maintain the rate of fluid flow through the detector 20 at a fixed rate, such as on the order of 100 cc./min. for a gas. As mentioned previously, the conventional types of flow rate controllers do not provide satisfactory performance at low rates of flow, and therefore cannot be used in the controlled line when it is desired to provide control down to 10 cc./min. or less for a gas.

The fluid component detectors 14 and 20 are of the continuously analyzing type, and are operable to produce electrical output signals which are substantially directly proportional to the amount of a particular component of the fluid being passed to the chemical process. The signals produced by the detectors 14 and 20 are also related to the rate of fluid flow. The fluid passing through the detector 20 is fed to waste or for recirculation in the particular system being used, as desired. However, the pressure at the outlet side of the detector should be sufficiently less than that at the intake point on the pipe 10 to permit sufficient fluid to flow through the system.

The electrical output signal from the fluid component detector 20 appears across the terminals of a potentiometer 22 and is related in some manner to the rate of flow of the fluid through the detector 20. The output signal from the fluid component detector 14 is likewise related to the fluid flow rate through that detector. Since the fluid flow is at a constant known rate through the detector 20, the potential across the potentiometer 22 is a standard or reference potential which is directly proportional to the amount of the component being measured, against which the output of the detector 14 is compared. A portion of the potential across the potentiometer 22 corresponding to the output potential of the detector 14 which should be produced at the desired flow rate is tapped off and combined in polarity opposition with the actual output from the detector 14 and fed to a servo-amplifier 24. The servo-amplifier 24 controls a servo-motor 26 which in turn is mechanically coupled through a clutch 28 and a shaft 30 to the valve 12.

If the flow rate of the fluid through the detector 14 is at the desired rate, the potential output from the detector 14 will correspond to that potential tapped off the potentiometer 22, and there will be no resultant signal to cause the servo-amplifier 24 to drive the motor 26. However, if the fluid flow rate is either faster or slower than desired, the output potential from the detector 14 will not correspond to that across the tapped portion of the potentiometer 22 and the resultant differential signal will cause the servo-amplifier 24 to drive the servo-motor 26 in a direction to compensate for the difference.

The rate of flow may be set to the desired value initially by manually turning the valve 12 while permitting the clutch 30 to slip, and then adjusting the potentiometer 22 to a setting at which the potential tapped off corresponds to the output potential of the detector 14. This setting may be achieved by adjusting the potentiometer 22 to a point where the servo-motor 26 does not operate to change the position of the valve 12. Alternatively, the potentiometer 22 may be calibrated so that the flow rate of the fluid to the chemical process may be conveniently set by merely adjusting the tap on the potentiometer 22 in accordance with a calibrated dial indication.

A change in the percentage of the fluid component being detected does not affect the system since the fluid through the detector 14 is obtained from the same source as that which flows through the detector 20. Furthermore, it is not necessary that the output potential from the detectors be a linear function of flow rate, for if any deviations from linearity enter into a given range of flow rates, these deviations can be compensated for by incorporating a flow meter in the controlled fluid line and measuring the output potential from the detector 14 at the desired flow rate. The ratio of this potential to the potential across the terminals of the potentiometer 22 at its standard or reference flow rate permits the system to be set up to operate as above.

With reference to Figure 2, the overall system is similar to that described with reference to Figure 1, the main difference being in the more detailed detectors which are shown in Figure 2 as extremely sensitive instruments for measuring minute traces of water in a gas. The water detecting and measuring apparatus shown provides a suitable means for continuously analyzing the water content of a gas down to a fraction of a part per million.

As was described in connection with Figure 1, gas from a main supply line 32 is passed at a constant rate through a reference water-detecting and measuring apparatus. The measurement of the water is accomplished by continuously and quantitively absorbing and electrolizing all water present in a gas stream entering the measuring apparatus. The electrolysis current, which is directly related to Faraday's law to the mass rate of flow of water into the instrument, is used as an indication of water content. The current obtained was found to be 13.2 microamperes per part per million (p.p.m.) at a flow rate of 100 cc./min. at atmospheric pressure. Because changes in sample flow rate as well as changes in concentration affect the mass rate of flow of water into the analyzer, the flow is kept constant by using a conventional inexpensive controller. Controlling flow to within 1% is simply accomplished with well known forms of restricters and regulators. The indication is then proportioned only to the water concentration, conveniently expressed in parts per million.

In this instrument, gas from the main supply line 32 passes through a porous metal filter 34 to the heart of the measuring instrument which is an electrolytic cell 36 in which both the aborption and electrolysis take place simultaneously. In one design that has proven practical, the absorbing material is in the form of a thin, viscous film in contact with two spirally wound platinum electrode wires on the inside of a "Teflon" tetrafluoroethylene resin tube through which the sample passes. The absorbed water is quantitatively electrolyzed to hydrogen and oxygen at the electrodes by the application of a D.C. voltage. This not only provides continuous indication of water content, but also maintains the film in an absorbent condition. The length of the element is largely governed by the fact that over 99% of the sample molecules must have a chance to diffuse to the absorbent wall during their transit time. At flow rates of about 10 cc./min. a length of approximately 2 feet is sufficient. The diameter of the bore is governed chiefly by practical matters such as tubing flexibility and cost of manufacture. Tubing having an internal diameter of less than a millimeter has been used successfully in a large number of cells. The entire cell is housed in a section of pipe 4 inches long with an outside diameter of ½ inch. This is accomplished by coiling the 2 to 3 foot long tubing element in a helix inside the pipe and then potting it in a plastic for permanence. The electrode leads 38 and 40 are brought out the sides through electrical insulators.

The absorbing material should be capable of removing very low concentrations of water from the sample gas stream. Furthermore, application of a D.C. potential between electrodes in contact with the material must result in current flow only by way of the process which results in electrolysis of water, and the material must be inert with respect to all other components in the sample stream.

Partially hydrated phosphorus pentoxide has proven to be an entirely satisfactory material to use in almost all applications that have been encountered.

After the gas leaves the electrolysis cell 36, it enters a suitable flow rate controller 42 and an adjustable restrictor 44, which maintains the gas flow rate constant at 100 cc./min. The rate of flow is finally observed on a rotameter 46. A bypass line 48 which includes a valve 50 is provided near the input to the cell, to make it possible to flush out the sample line, and thereby decrease the response time of the instrument. It can be noted that the electrolysis cell 36 is the first major component that the gas stream reaches. This is highly desirable since it enhances the response time of the instrument.

The electrical circuit for the electrolysis cell includes a pair of variable resistors 52 and 54 and a battery 56, all connected in series with the electrolysis cell electrodes 38 and 40. The resistor 52 provides multiple ranges for the water detector, and the resistor 54 serves as a conventional shunt for the meter M, which provides a direct reading of the water concentration in the gas stream. The battery 56 may, if desired, be replaced by a line operated D.C. power supply which provides the desired voltage. It has been found that a voltage in the neighborhood of 45 volts ensures quantitative operation at low ranges. The exact value of this voltage is not critical. Quantitative operation at concentrations above 100 p.p.m. can be achieved by application of lower voltages. When an analyzer is built for concentrations above 1000 p.p.m., it is desirable to reduce the voltage in order to reduce heating from resistive dissipation in the cell. The minimum operable voltage is 2 volts, the thermodynamic decomposition voltage for water. At lower voltages no electrolysis of water takes place regardless of its concentration in the film.

A variable output resistor 58 is connected in parallel with the meter shunt resistor 54, and the voltage appearing across the terminals of the output resistor 58 is representative of the water content of the gas stream.

The gas stream of the pipe line 32 passes through a flow rate control valve 60 which may for example comprise a needle valve, and a water detector means to the desired process. The water detector means shown is the same as that previously described and includes a porous metal filter 62, an electrolysis cell 64 and a rotometer 66 for indicating the rate of flow of the gas to the process. A by-pass line 68 and valve 70 are also provided to make it possible to flush out the pipe line and increase the response time of the instrument as previously described. The main pipe line water detector is otherwise similar in construction to the reference detector, except it does not include a flow regulator and a restrictor, since the required flow rate may be too low to be automatically controlled by these devices.

The electrolysis cell 64 is provided with a pair of electrodes 71 and 73 which are connected with a series circuit including a pair of variable resistors 72 and 74, and a battery 76. The resistor 72 provides a range switch for the detector for covering the same ranges as does the reference detector, and the resistor 74 is a shunt for the meter $M_1$. The output potential for this detector is developed across the meter shunt resistor 74.

The potential across a portion of the resistor 58 is combined in polarity opposition with the potential across the resistor 74 and the resultant or differential potential is fed to a servo-amplifier 80 which controls a servo-motor 82. The servo-motor 82 is mechanically connected through a shaft 84 and a clutch 86 to the flow rate control valve 60. It may be desirable to provide a step-down gear driving system between the servo-motor 82 and the valve 60 so that the valve is slowly adjusted. This delay compensates for any response time delay in the detector 14 and thereby prevents hunting in the servo-system. If the potential tapped off the resistor 58 is equal to the potential across the resistor 74, there will be no input to the servo-amplifier 80. If there is a difference in these two voltages, the differential input will cause the servo-amplifier 80 to drive the servo-motor 82 in a direction determined by the sense of the differential voltage. The servo-motor then changes the valve 60 setting to increase or decrease the flow rate through the electrolysis cell 64 so that the resultant potential across the resistor 74 will eventually equal the potential tapped off the resistor 58.

Since the flow rate is constant through the reference detector including the electrolysis cell 36, the voltage across the resistor 58 is affected only by the water content of the gas stream. Likewise the flow rate through the main supply line including the electrolysis cell 64 is controlled by the system at a desired level so that the voltage across the resistor 74 is also only affected by the water content of the gas. Since the output potential is directly proportional to the water content, the ratio of the respective output potentials across the resistors 58 and 74 will always be the same, so long as the gas stream through the different electrolysis cells is the same or derived from a common source.

If desired, the gas flow to the process may be controlled not only at low rates but at much higher rates of flow. In this respect, it should be observed that it is not necessary that the output potential across the load resistor 74 be a linear function of the flow rate, since the variable arm of the load resistor 58 may be calibrated to read directly in flow rates so that the proper potential is tapped off merely by setting the arm to the desired indicated rate. The servo-system will then adjust the flow of the gas stream in the main line and through the electrolysis cell 64 until a potential corresponding to that tapped off the resistor 58 appears across the resistor 74.

Alternatively, the desired flow rate to the process may be set by manually adjusting the valve 60 and observing the flow rate on the rotometer 66. This setting is made by permitting the clutch 86 to slip so that the servo-motor shaft is not rotated. The tap on the resistor 58 is then adjusted until there is no net input to the servo-amplifier 80 which will be apparent when the servo-motor is no longer driven. If desired, the setting may be made by measuring the potential across the resistor 74 at the required flow rate, and the ratio of this voltage to the primary voltage across the resistor 58 permits the system to be set up to operate as described above.

Figure 3:
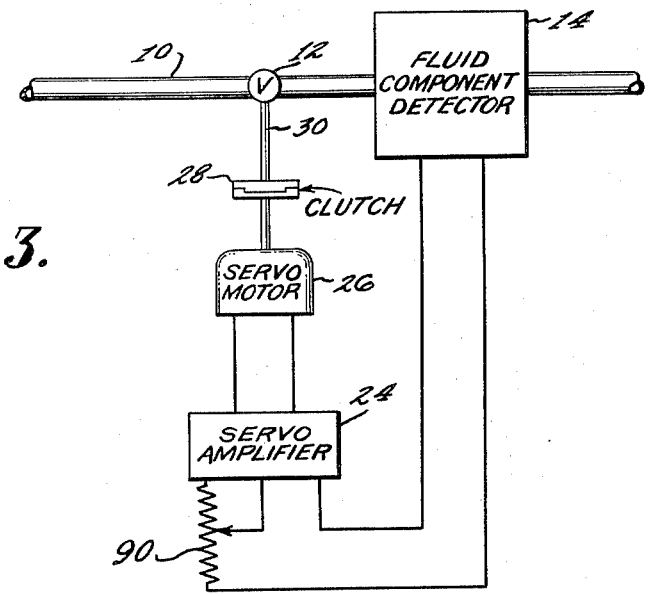
Figure 3 is a simplified schematic flow and electric circuit diagram of a modification of the automatic fluid flow system of the invention shown in Figure 1.

In some applications the flow rate of a fluid such as a gas can be regulated without using a reference detector, as is indicated in Figure 3. As mentioned above, with reference to Figures 1 and 2, the output signal from the fluid component detector is primarily a function of fluid flow rate and of the relative amount of the component of the gas being detected. If the amount of the component being detected in the gas stream is maintained substantially constant or varies only slightly, the signal output from the detector will be primarily a function of the flow rate of the gas. Under these conditions the output from the detector can be used to drive a servo-system which controls a suitable gas flow regulating means.

The controlling system shown in Figure 3 is substantially the same as that shown in Figure 1 except for the elimination of the reference detector 20 and associated components. In Figure 3, the relative amount of the component of the gas detected by the detector 14 remains substantially constant or is maintained within the required limits so that the output from the detector is primarily a function of the rate of flow of the gas. The output of the detector 14 is then fed to the servo-amplifier 24 which then automatically maintains the flow rate constant as described hereinbefore. In order to adjust the system to automatically control the flow rate at a desired value, a variable bias resistor 90 is connected with the servo-amplifier 24. The bias resistor 90 may be connected with a suitable direct current supply means to develop a control potential across the terminals thereof. A selected portion of the potential developed thereacross may be combined with the output from the detector 14, and the system then operates in a manner similar to that described in connection with Figure 1, except that the potential developed over the resistor 22 of Figure 1 is replaced by the potential developed across the resistor 90 in Figure 3.

In accordance with the invention, a fluid flow control system has been provided which is operable to automatically control the flow of a fluid such as a gas at extremely low rates. The flow rate of the gas may be accurately and effectively controlled by deriving an electrical signal which is representative of the amount of one of the components of the gas at the required flow rate and comparing that signal with a reference signal which is representative of the amount of the same component of the gas at a standard or reference rate of flow. The resultant comparison is used to control a suitable servo-system which operates a flow rate control means in the controlled supply line, and is effective notwithstanding any changes in the relative amounts of the component being measured.

What is claimed is:

1. A control system for automatically regulating the flow of a fluid comprising in combination, a first detector through which the fluid stream to be controlled is passed, said detector being operable to produce an electrical output signal the magnitude of which is a function of the relative amount of one of the components comprising the fluid and of the flow rate of the fluid, a second detector responsive to produce an electrical output signal the magnitude of which is a function of the relative amount of said component in said fluid and to the flow rate of the fluid, means for passing fluid from said stream through said second detector at a constant rate of flow, electric circuit means for comparing the electrical output signals from said first and second detectors, control means for regulating the flow of said fluid stream through said first detector, and means providing a servo-system for adjusting said control means connected with and responsive to the output from said electric circuit means for adjusting said control means to change the flow rate of said fluid stream through said first detector when the electrical output signal from said first detector does not correspond in a predetermined manner with the electrical output signal from said second detector.

2. A control system for automatically regulating the flow of a gas stream to a chemical process or the like comprising in combination, a first detector through which the gas stream to be controlled is passed, said detector being operable to produce an electrical output signal the magnitude of which is a function of the relative amount of the water in the gas stream and of the flow rate of the gas stream, a second detector responsive to produce an electrical output signal the magnitude of which is a function of the relative amount of water in said gas stream and to the flow rate of said gas stream, means for passing gas from said stream through said second detector at a constant rate of flow, electric circuit means for comparing the electrical output signals from said first and second detectors, control means for regulating the flow of said gas stream through said first detector and means providing a servo-system for adjusting said control means connected with and responsive to the output from said electric circuit means for adjusting said control means to change the flow rate of said gas stream through said first detector when the electrical output signal from said first detector does not correspond in a predetermined manner with the electrical output signal from said second detector.

3. A control system for automatically regulating the flow of a gas comprising in combination, a first electrolysis cell through which the gas stream to be controlled is passed, said electrolysis cell including absorbing means for absorbing water from said gas stream, direct current supply means connected with said electrolysis cell, the magnitude of current flowing in said cell being substantially directly proportional to the amount of water absorbed by said absorbing means, a second electrolysis cell including absorbing means for absorbing water from the gas passed through said cell, direct current supply means connected with said second electrolysis cell, the magnitude of current flowing in said second cell being substantially directly proportional to the water absorbed by the absorbing means in said second cell, means providing a flow regulator and an adjustable restrictor for maintaining the flow of gas through said second electrolysis cell at a constant rate, electric circuit means for comparing the currents from said first and second detectors, control means for regulating the flow of said gas stream through said first cell and means providing a servo-system for adjusting said control means connected with and responsive to the output from said electric circuit means for adjusting said control means to change the flow rate of said gas stream through said first cell when the current from said first cell does not correspond in a predetermined manner with the current from said second cell.

4. A control system for automatically regulating the the flow of a gas comprising in combination, a first electrolysis cell through which the gas stream to be controlled is passed, said electrolysis cell including absorbing means for absorbing water from said gas stream, direct current supply means connected with said electrolysis cell, the magnitude of current flowing in said cell being substantially directly proportional to the amount of water absorbed by said absorbing means, a second electrolysis cell including absorbing means for absorbing water from the gas passed through said cell, direct current supply means connected with said second electrolysis cell, the magnitude of current flowing in said second cell being substantially directly proportional to the water absorbed by the absorbing means in said second cell, means for passing gas from said stream through said second cell at a constant rate of flow, means connecting a first resistor with said first cell to produce a first potential corresponding to the current in said first cell, means connecting a second resistor with said second cell to produce a second potential corresponding to the current in said second cell, electric circuit means for combining said first and second potentials, control means for regulating the flow of said gas through said first cell, and means providing a servo-system for adjusting said control means connected with and responsive to the output from said electric circuit means for adjusting said control means to increase the flow rate of said gas stream through said first cell when the ratio of said first potential to said second potential is less than a predetermined value.

5. A control system for automatically regulating the flow of a gas comprising in combination, an electrolysis cell through which the gas stream to be controlled is passed, said electrolysis cell including absorbing means for absorbing water from said gas stream, direct current supply means connected with said electrolysis cell, the magnitude of current flowing in said cell being a function of the amount of water absorbed by said absorbing means, and control means responsive to the current from said cell for adjusting the flow rate of said gas stream through said cell.

References Cited in the file of this patent

UNITED STATES PATENTS

| | | |
|---|---|---|
| 1,930,455 | Hannum | Oct. 10, 1933 |
| 2,139,126 | Jennings | Dec. 6, 1938 |
| 2,165,182 | Luhrs | July 4, 1939 |
| 2,352,584 | Ziebolz et al. | June 27, 1944 |
| 2,509,295 | Glass | May 30, 1950 |
| 2,545,732 | Hamilton | Mar. 20, 1951 |
| 2,569,911 | Ziebolz | Oct. 2, 1951 |
| 2,592,834 | Tiffany | Apr. 15, 1952 |
| 2,781,249 | Pisano | Feb. 12, 1957 |